(12) United States Patent
Gupta et al.

(10) Patent No.: US 7,657,574 B2
(45) Date of Patent: Feb. 2, 2010

(54) PERSISTENT STORAGE FILE CHANGE TRACKING

(75) Inventors: Anoop Gupta, Seattle, WA (US);
William E. Stelzel, Issaquah, WA (US);
Anh Phuong Tran, Seattle, WA (US);
Gary William Hall, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 11/144,893

(22) Filed: Jun. 3, 2005

(65) Prior Publication Data

US 2006/0277223 A1 Dec. 7, 2006

(51) Int. Cl.
*G06F 12/00* (2006.01)
*G06F 17/30* (2006.01)
(52) U.S. Cl. ..................... 707/201; 707/203
(58) Field of Classification Search ................ 707/100, 707/200–206
See application file for complete search history.

(56) References Cited

U.S. PATENT DOCUMENTS

| | | | | |
|---|---|---|---|---|
| 5,831,664 A * | 11/1998 | Wharton et al. | ............... | 725/81 |
| 5,870,765 A * | 2/1999 | Bauer et al. | ................. | 707/203 |
| 5,991,771 A * | 11/1999 | Falls et al. | ................... | 707/202 |
| 6,023,692 A * | 2/2000 | Nichols | ........................ | 706/14 |
| 6,324,544 B1 * | 11/2001 | Alam et al. | .................. | 707/201 |
| 6,502,205 B1 * | 12/2002 | Yanai et al. | ..................... | 714/7 |
| 6,879,997 B1 * | 4/2005 | Ketola et al. | ................ | 709/208 |
| 7,032,003 B1 * | 4/2006 | Shi et al. | ..................... | 709/203 |
| 7,035,878 B1 * | 4/2006 | Multer et al. | ............... | 707/201 |
| 7,055,059 B2 * | 5/2006 | Yanai et al. | ..................... | 714/7 |
| 2001/0054180 A1 * | 12/2001 | Atkinson | ..................... | 725/32 |
| 2002/0174139 A1 * | 11/2002 | Midgley et al. | ............. | 707/204 |
| 2003/0081557 A1 * | 5/2003 | Mettala et al. | .............. | 370/252 |
| 2003/0084056 A1 * | 5/2003 | DeAnna et al. | ............. | 707/100 |
| 2003/0229654 A1 * | 12/2003 | Bibas et al. | .................. | 707/203 |
| 2004/0024795 A1 * | 2/2004 | Hind et al. | ................... | 707/204 |
| 2004/0216125 A1 * | 10/2004 | Gazda et al. | ................ | 719/310 |
| 2005/0021866 A1 * | 1/2005 | Kang et al. | ................. | 709/248 |
| 2005/0070259 A1 * | 3/2005 | Kloba et al. | ............. | 455/414.2 |
| 2005/0073982 A1 * | 4/2005 | Corneille et al. | ........... | 370/338 |
| 2005/0075115 A1 * | 4/2005 | Corneille et al. | ......... | 455/456.3 |
| 2005/0125621 A1 * | 6/2005 | Shah | .......................... | 711/173 |
| 2005/0131924 A1 * | 6/2005 | Jones | ......................... | 707/100 |
| 2005/0172296 A1 * | 8/2005 | Schleifer et al. | ............ | 719/310 |
| 2005/0198247 A1 * | 9/2005 | Perry et al. | .................. | 709/223 |
| 2005/0223047 A1 * | 10/2005 | Shah et al. | ................... | 707/201 |
| 2005/0260973 A1 * | 11/2005 | van de Groenendaal | ..... | 455/411 |
| 2005/0289350 A1 * | 12/2005 | Schmidt-Karaca | .......... | 713/176 |
| 2006/0085485 A1 * | 4/2006 | Shimshoni | .................. | 707/200 |
| 2006/0147043 A1 * | 7/2006 | Mann et al. | .................. | 380/270 |
| 2006/0190984 A1 * | 8/2006 | Heard et al. | .................... | 726/1 |
| 2006/0206502 A1 * | 9/2006 | Gaurav et al. | ............... | 707/100 |
| 2006/0236363 A1 * | 10/2006 | Heard et al. | .................... | 726/1 |

* cited by examiner

*Primary Examiner*—Mohammad Ali
*Assistant Examiner*—Angelica Ruiz
(74) *Attorney, Agent, or Firm*—Woodcock Washburn LLP (57) ABSTRACT

Systems and methodologies that facilitate synchronization of a mobile device with a source, via employing a file change tracking database table created in non-volatile memory to designate files for synchronization. The subject invention includes a file modification logger that detects and track changes to files across multiple file systems. The file change tracking database table has a plurality of columns such as: a unique identification column that identifies a file, a file name, previous time the file was changed, and previous time the file was synchronized with a particular machine. A list of files that have changed between a current time and an earlier time can be designated for synchronization, by evaluating when was the file last changed and/or synchronized with a source device (e.g., a desktop, or a lap top.)

20 Claims, 10 Drawing Sheets

| Unique ID | Filename | Last Change Time | Last Synchronization Time – Source 1 | Last Synchronization Time – Source 2 |
|---|---|---|---|---|
| 1 | a.doc | 1 | 0 | 0 |
| 2 | b.doc | 1 | 0 | 0 |
| 3 | c.doc | 1 | 0 | 0 |

Fig. 4a

| Unique ID | Filename | Last Change Time | Last Synchronization Time – Source 1 | Last Synchronization Time – Source 2 |
|---|---|---|---|---|
| 1 | a.doc | 1 | 4/23 9:00 AM | 0 |
| 2 | b.doc | 1 | 4/23 9:00 AM | 0 |
| 3 | c.doc | 1 | 4/23 9:00 AM | 0 |
| 4 | d.doc | 4/23 9:00 AM | 4/23 9:00 AM | 0 |

PERSISTENT STORAGE FILE CHANGE TRACKING

BACKGROUND

The volume, use and complexity of computers and electronic devices are continually increasing. Computers consistently become more powerful and improved electronic devices are continually developed (e.g., digital audio players, video players). Additionally, the growth and use of digital media (e.g., digital audio, video, images, and the like) have further pushed development of these devices. Such growth and development has vastly increased the amount of information desired/required to be stored and maintained for computer and electronic devices.

Generally, information is stored and maintained in one or more of a number of types of storage devices. Storage devices include long term storage mediums such as, for example, hard disk drives, compact disk drives and corresponding media, digital video disk (DVD) drives, and the like. The long term storage mediums typically store larger amounts of information at a lower cost, but are slower than other types of storage devices. Storage devices also include memory devices, which are often, but not always, short term storage mediums.

Memory devices tend to be substantially faster than long term storage mediums. Such memory devices include, for example, dynamic random access memory (DRAM), static random access memory (SRAM), double data rate memory (DDR), flash memory, read only memory (ROM), and the like. Memory devices are subdivided into volatile and non-volatile types. Volatile memory devices generally lose their information if they lose power and typically require periodic refresh cycles to maintain their information. Volatile memory devices include, for example, random access memory (RAM), DRAM, SRAM and the like. Non-volatile memory devices maintain their information whether or not power is maintained to the devices. Non-volatile memory devices include, but are not limited to, ROM, programmable read only memory (PROM), erasable programmable read only memory (EPROM), flash memory and the like. Volatile memory devices generally provide faster operation at a lower cost as compared to non-volatile memory devices.

Memory devices generally include arrays of memory cells. Each memory cell can be accessed or "read", "written", and "erased" with information. The memory cells can typically maintain information in an "off" or an "on" state (e.g., are limited to 2 states), also referred to as "0" and "1". Typically, a memory device is addressed to retrieve a specified number of byte(s) (e.g., 8 memory cells per byte). For volatile memory devices, the memory cells must be periodically "refreshed" in order to maintain their state.

At the same time, emerging mobile devices such as mobile telephones, smart phones, and handheld computers are commonly incorporating such persistent storage functionality. Moreover, often a user has a plurality of such devices for which synchronization and/or cross-pollination of data is desired. By way of example, it is not uncommon for a user to have a PDA, a mobile telephone, a home personal computer (PC) and a work PC, wherein cross-pollination of data between such devices facilitates the user's efficiency.

Accordingly, and as file systems on persistent storage devices become more strategic and popular, new challenges can arise for efficient and proper maintenance of such systems. For example, in general there exists little or no support for file change tracking in non-volatile memory, as existing file change tracking technology typically operates on Random Access Memory (RAM).

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods that facilitate synchronization of a mobile device with a source, via employing a file change tracking database table created in non-volatile memory that designate files for synchronization, and a file modification logger that detects and track changes to files across multiple file systems. The file change tracking database table can include a plurality of columns such as: a unique identification column that identifies a file, a file name, previous time the file was changed, and previous time the file was synchronized with a particular source. Also, the file modification logger can register with an operating system to provide notification of when a file is changed.

Accordingly, a file can be tracked with a unique identification (file ID), which is associated with a respective file time for that file ID, and indicated in the file change tracking database table. Thus, a list of files that have changed between a current time and an earlier time can be designated for synchronization, by evaluating when the file was last changed and/or synchronized with a source device (e.g., a desktop, lap top and the like.) Also, the subject invention enables synchronizing of files with other storage mediums besides the built in storage, such as synchronizing with storage cards and removable storage mediums. It is to be appreciated that additional columns can be added to such file change tracking database table, e.g., based on requirements of the synchronization source, files to be synchronized, database table modeled and the like.

In a related aspect of the subject invention, during an initial synchronization of a mobile device with a synchronization source, a file change tracking database table can be set up on the mobile device with a column designating the unique IDs of the files contained therein. A second column of such file change tracking database table can indicate a previous time that the file was changed, and a third column associated with the file change tracking database table designates a previous time that such files were synchronized (with a value of "0" assigned for an initial synchronization).

A request can be made for synchronization when the time the file was last modified (as indicated in the second column), is after the time such file was synchronized (as indicated in the third column). Accordingly, in the case for initial synchronization all files will show up, as they are not updated on the synchronization source (e.g., the desktop). All files can then be sent to the desktop, and the third column in the file change tracking database table updated accordingly.

According to another aspect of the subject invention user behavior can be modeled via an artificial intelligence component, and/or roll back to earlier state of the files can be implemented, to obtain a state of the file at a particular synchronization stage. In addition, the file change tracking database table of the subject invention can provide synchronization of the device with multiple desktops. To enable files to cross-pollinate between desktops, a last synchronization for a particular desktop can be tracked. For example, a version tracking among the multiple desktops can be provided, such that when the device is synchronizing with desktop 1, new and modified files are determined by comparing the associated time of the file system with that of synchronization last occurring with desktop 1. Likewise if the device is synchronizing with desktop 2, new and modified files are determined by comparing the file system to the file system time when files were last synchronized with desktop 2.

In a further aspect of the subject invention, a new file can be identified when an associated path of the file does not appear in the file change tracking database table. Upon identifying the new file, such file is then added to the file change tracking database table and an associated ID generated. Moreover, if a currently existing file is modified, then a synchronization with the source for such modification can be derived by a comparison of the current file system time to that in the file change tracking database table. If the comparison indicates a difference, then the file has changed since the last tracking session, and its unique ID should be sent to the desktop as part of a list of changed items.

Likewise, a file can be considered deleted when associated file paths that exist in the file change tracking database table fail to appear in a file scan. Accordingly, the unique ID and associated data are deleted from the file change tracking database table, and the unique ID sent to the desktop as part of a list of changed items. Similarly, the subject invention can recognize moved files via a combination of identifying a new file (destination location) and deleted file (old location) mechanism.

According to a methodology of the subject invention, upon connection of a mobile device with a desktop, a partnership is initially created between the devices. Subsequently, a list of files to be synchronized is identified, and a table generated with the file IDs to be synchronized. Such table can also include information obtained from the operating system (OS) regarding the last time the file was changed. Next, the selected files can be synchronized with the desktop and the table updated to reflect such synchronization. The Subject invention can also consider time change features (e.g., for day light savings, zone changes, and the like) in synchronization of the source device via the file change tracking database table.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Figure 1:
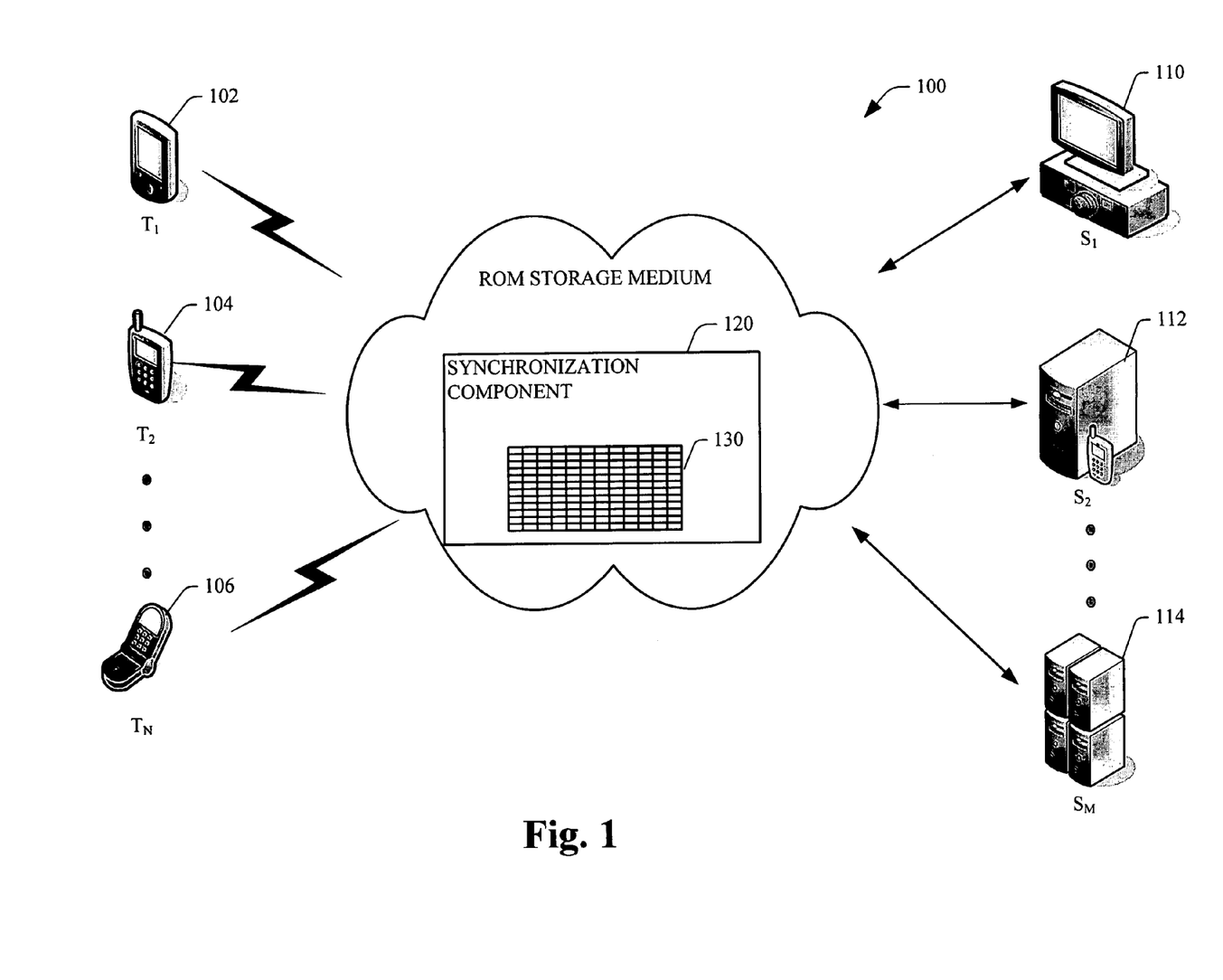
FIG. 1 illustrates a block diagram of a persistent storage file change tracking system in accordance with an aspect of the subject invention.

The subject invention provides for systems and methods of synchronizing a mobile device with a synchronization source, via employing a file change tracking database table as part of a read-only memory (ROM) environment to detect and track changes to files across multiple file systems. Referring initially to FIG. 1, a system 100 is illustrated with a synchronization component 120 in accordance with an aspect of the subject invention. The synchronization component 120 can synchronize a mobile device(s) 102, 104, 106 ($T_1$ thru $T_N$, where N is an integer) with a source device(s) 110, 112, 114 (S₁ thru S$_M$, where M is an integer), and enable a change tracking in both persistent and non-persistent storage sections of an operating system (OS). The mobile device 102, 104, and 106 can possess Random Access Memory (RAM) and Read only memory (ROM), and can include mobile phones, personal digital assistants, and the like, which can be part of a distributed network of devices. Likewise, the source device(s) can be desktops, computing devices, and the like, which can also be part of a network configuration.

According to one aspect of the subject invention, the synchronization component 120 can employ a file change tracking database table 130 that is created in read-only memory (ROM) to detect and track changes to files across multiple file systems. The file change tracking database table 130 can be in a database form having a plurality of columns, such as: a unique identification column that identifies a file, a file name, previous time the file was changed, and previous time the file was synchronized with a particular machine, as will be described in detail infra.

In addition, a file can be tracked with a unique identification (file ID), which is associated with a respective file time for that file ID, and tracking results indicated in the file change tracking database table 130. Thus, a list of files that have changed between a current time and an earlier time can be tracked for synchronization, by evaluating and/or comparing when the file was last changed and/or synchronized with a source device (e.g., a desktop, lap top and the like.)

Moreover, such an arrangement according to the subject invention can also enable synchronizing of files with other storage mediums besides the built in storage, such as synchronizing with storage cards and removable storage mediums. It is to be appreciated that additional columns can be added to such file change tracking database table, e.g., based on requirements of the synchronization source, files to be synchronized, database table modeled and the like.

Figure 2:
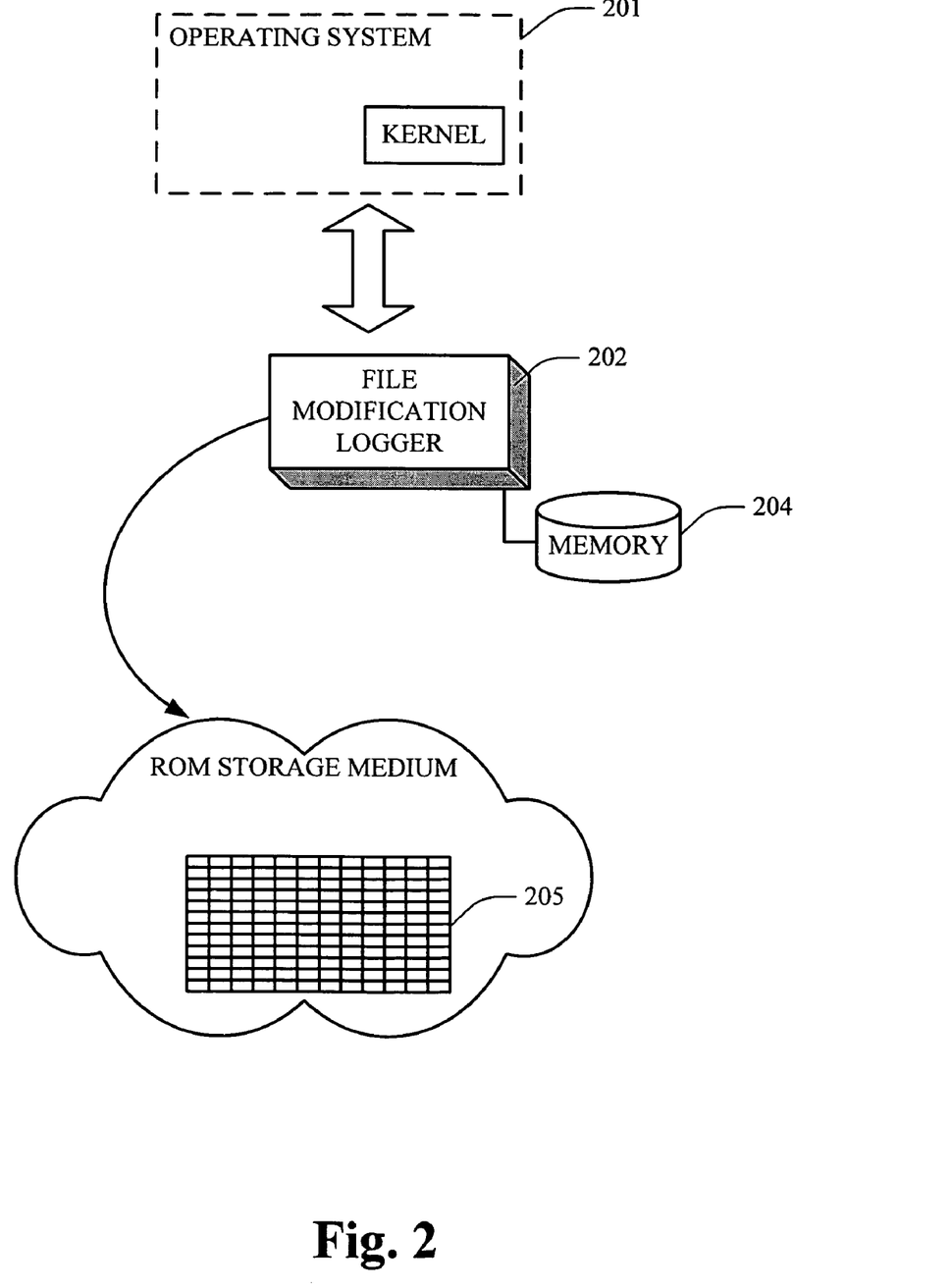
FIG. 2 illustrates a file modification logger that can facilitate logging operation associated with modification of files to be synchronized in accordance with an aspect of the subject invention.

In a related aspect of the subject invention and as illustrated in FIG. 2, when the file change tracking database table 202 is established, then a registration can occur with an operating system 201 of the device. Such registration can provide notification for when a file is changed. Also, the file modification logger 202 can facilitate logging operation associated with modification of files. The file modification logger 202 can include a memory 204 that stores data related to event tracking for a file, and avail such data to subsequent processes such as data viewing, data communications data logging processes, and the like. In one exemplary aspect, the data stored in the memory 204 can be flushed when such memory becomes substantially full and/or upon occurrence of a timeout condition. For example upon reaching a predetermined level, pointers associated with memory 204 can be reset, data can be overwritten on the contents of such memory, and/or data can be transported to other components such as data communication devices, processes and disks.

In addition, a timer can be employed to selectively associate a time stamp with modification events of files as the files are modified. Such a time stamp can for example include a bit count, a time of day indicator, a real time count, an absolute time count, a relative time count and the like. As such, information about the files that have been modified can be gathered and reflected in the associated column in the file change tracking database table.

Figure 3:
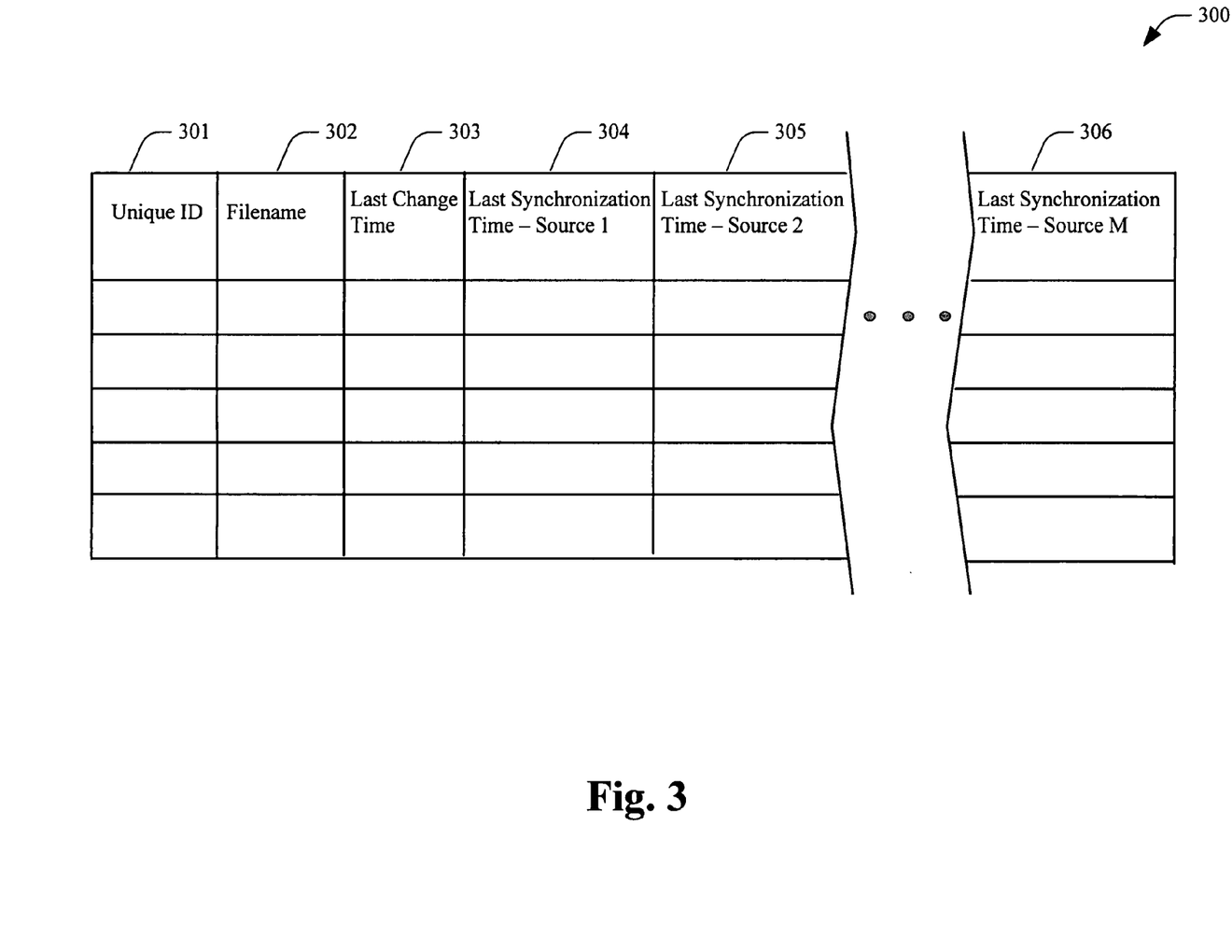
FIG. 3 illustrates a file change tracking database table in accordance with an aspect of the subject invention.

FIG. 3 illustrates a file change tracking database table 300 in accordance with an aspect of the subject invention. The file change tracking database table 300 can include a plurality of columns 301-306 (Source 1 thru Source M, where M is an integer). Column 301 indicates a column that contains unique identifications (file ID) that are assigned to files requiring synchronization. When a new file is created, a new ID can be generated for such file and indicated in column 301. Up to 32 bit can be used for such file ID, for example. Column 302 indicates the column containing the name of files to be synchronized with a synchronization source. Such in general can include any type of file such as image, text and the like. A default setting can be established to synchronize files in a predetermined directory (e.g., my documents). As such, the mobile device can build the file change tracking database table 300 based on such predetermined directory.

Column 303 indicates the last time a file was changed. To determine whether a file has been modified, such column can be compared to a current file system time. If a difference exists between the compared times, then the file has been modified. As such, the unique identifications of column 301 can be sent to synchronization source (e.g., a desktop) and synchronization session established between the synchronization source and the device. For a new file, a value of "1" can be initially assigned to such column.

Column 304 indicates a last time the file was synchronized with a source device 1. It is to be appreciated that similar columns 305-306 can be established to indicate synchronization with a source device M (where M is an integer), as the subject invention enables cross pollination between desktops, wherein a last synchronization for a particular desktop can also be tracked. Typically for a new file, an initial value of "0" can be assigned that is less than the value "1" assigned to column 303 for the file. Accordingly, a request from the file change tracking database table 300 to indicate files that have a last change time that is greater than the last synchronization time, shows the new files.

As explained earlier, the file change tracking database table 300 can supply synchronization of the mobile device with a plurality of source devices. Thus, additional columns can be added to the file change tracking database table 300 (e.g., columns 305-306) based on the number of source devices, type of files to be synchronized, and the like.

Figure 4A:
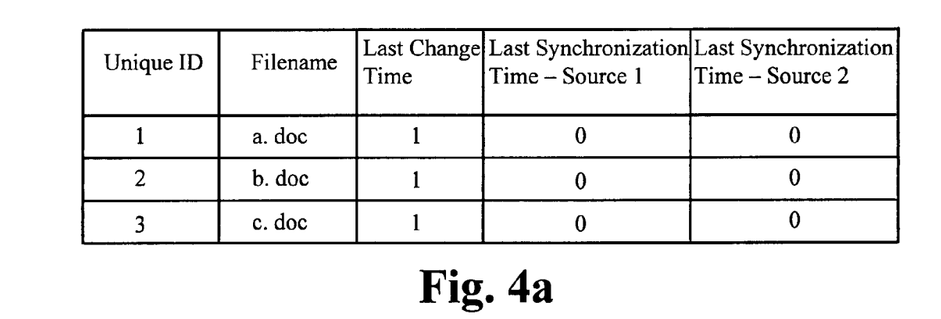
FIGS. 4a and 4b, illustrate an initial synchronization of a mobile device with a source 1 and a source 2 according to an aspect of the subject invention.
Figure 4B:
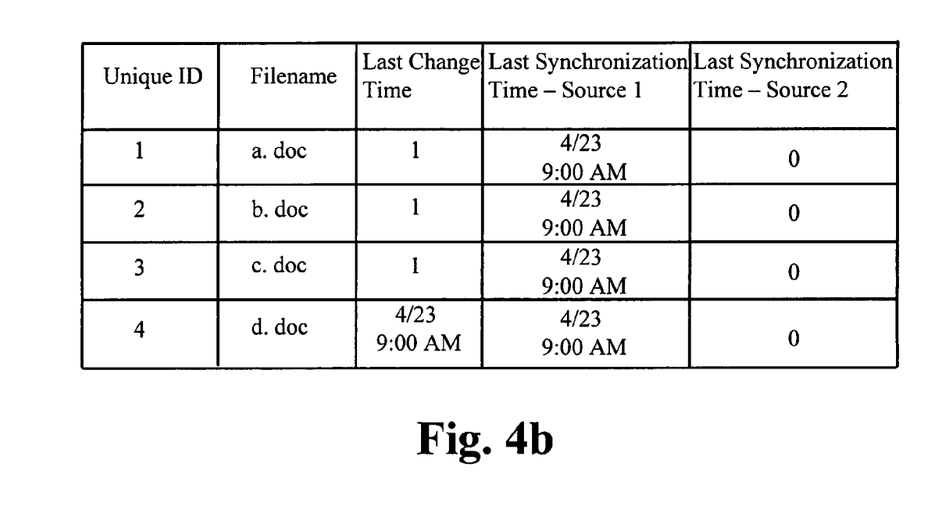

Referring now to FIGS. 4*a* and 4*b*, an initial synchronization of a mobile device with a source 1 and a source 2 is illustrated. Initially a user can designate a group of new files that require synchronization with such sources. As illustrated in FIG. 4*a*, three new files "a.doc", "b.doc" and "c.doc" are set up for an initial synchronization with the sources. Such new files are assigned a value "1" for the last change time and a value of "0" for a last synchronization time with source 1 and source 2. A request for all files from the database table that have a last change time that is greater than the last synchronization time with source 1 results in the files "a.doc", "b.doc", and "c.doc". Moreover, if source 1 synchronizes down a file to the mobile device, (e.g., "d.doc") then such file will be added to the file change tracking database table. When synchronization with source 1 is complete, then the last time synchronization occurred between the mobile device and source 1 is indicated. For example, FIG. 4*b* illustrates a last synchronization time on April 23$^{rd}$ at 9:00 AM with source 1.

In general and as explained earlier, when a file change tracking database table is set, a registration with the operating system is performed to facilitate obtaining notification about when a file has changed. An exemplary API can include:

```
HANDLE FindFirstChangeNotification(
    LPCTSTR lpPathName,
    BOOL bWatchSubtree,
```

-continued

```
DWORD dwNotifyFilter
);
``` wherein, the wait functions can monitor the specified directory or subtree by using the handle returned by the FindFirstChangeNotification function,

```
BOOL FindNextChangeNotification(
HANDLE hChangeHandle
);
```

A notification by the operating system can prompt a change in the last change time column for the associated file. If an existing file is modified, then synchronization with a source for such modification can be derived by a comparison of the current file system time to that in the file change tracking database table. If the comparison indicates a difference, then the file has changed since the last tracking session, and its unique ID should be sent to the source as part of a list of changed items.

Figure 5:
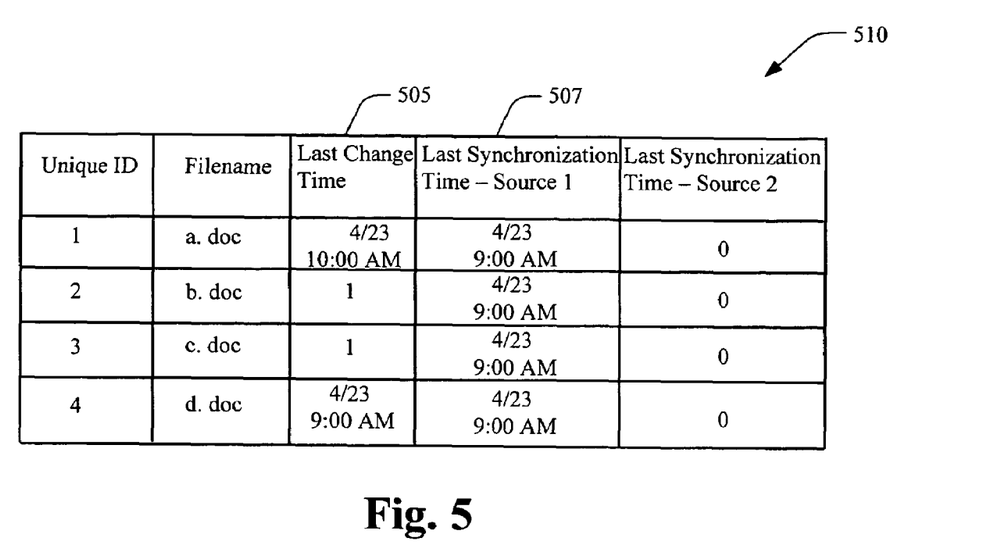
FIG. 5 illustrates a file change tracking database table, wherein a file has been modified therein in accordance with an aspect of the subject invention.

For example, FIG. 5 illustrates a file change tracking database table 510, wherein a file has been modified therein in accordance with an aspect of the subject invention. As illustrated in FIG. 5, the operating system can supply notification, (e.g., via the file modification logger) that "a.doc" has been modified at 10:00 AM on April $23^{rd}$. Thus, the last change time column 505 associated with "a.doc" is updated to reflect such modification. Subsequently, a query on comparison of columns 505 and 507 for "a.doc" indicates a difference, and that "a.doc" has changed since the last synchronization session, and its unique ID should be sent to the source for synchronization as part of a list of changed items.

Likewise, a file can be considered deleted when associated file paths that exist in the file change tracking database table fail to appear in a file scan. Accordingly, the unique ID and associated data are deleted from the file change tracking database table, and the unique ID sent to the desktop as part of a list of changed items. Similarly, the subject invention can recognize moved files via a combination of identifying a new file (destination location) and deleted file (old location) mechanism.

Figure 6:
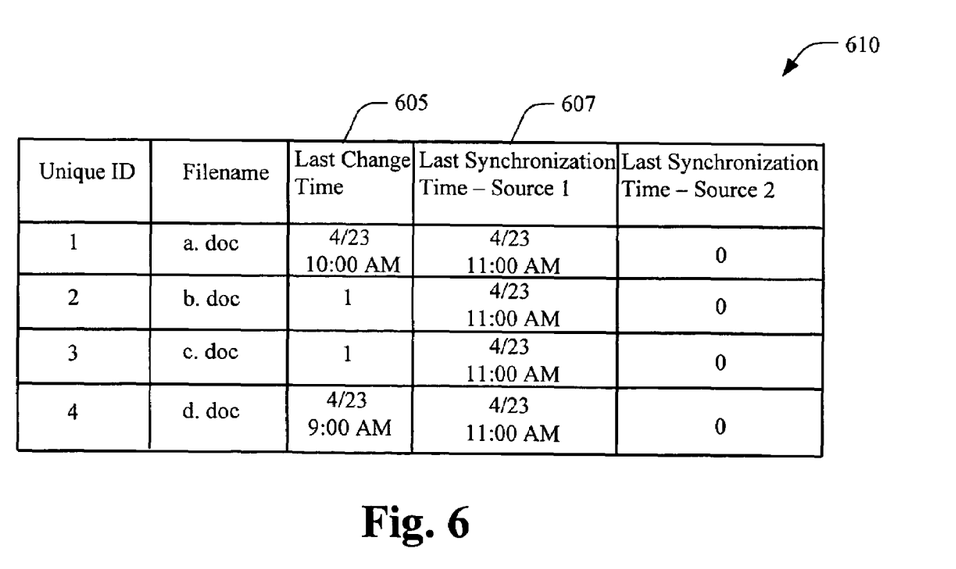
FIG. 6 illustrates synchronization back with a first source, according to one aspect of the subject invention.

In a related aspect of the subject invention, additional synchronization with the same source can occur according to similar acts employed for an initial synchronization with such source. For example, FIG. 6 illustrates a synchronization back with source 1, wherein the device can send up a list of files required for synchronization and the source can request files that have changed. Accordingly and to determine the changed files, a query can again be performed on the file change tracking database 610 for all files that have a last change time 605 that is greater than the last synchronization time 607 with that source. Subsequently and upon completion of synchronization, the last synchronization time 607 for such source is updated. As illustrated in FIG. 6, the last synchronization time with source 1 occurred at 11:00 AM on April $23^{rd}$ as reflected in column 607.

Figure 7:
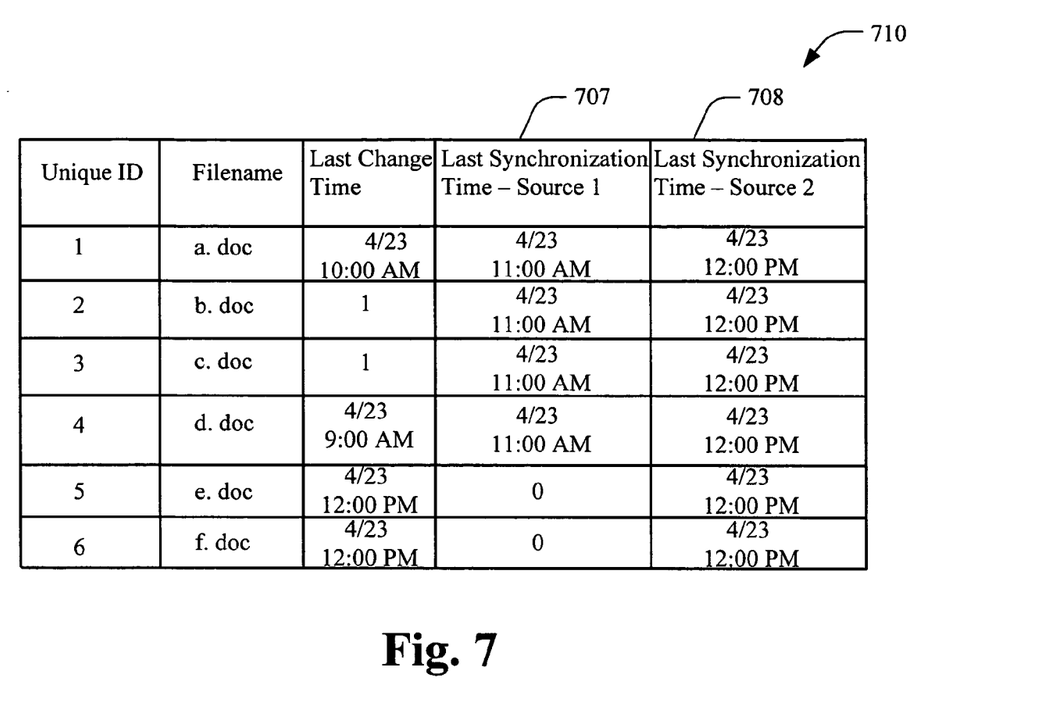
FIG. 7 illustrates a file change tracking database with files added thereto.

According to a further aspect of the subject invention, synchronization of the mobile device with a second source can also occur. Referring to FIG. 7, a file change tracking database 710 is illustrated, wherein files "e.doc" and "f.doc" are synchronized down to the mobile device. Such files have not been synchronized with source 1 and a value of "0" appears in column 707 for such files. Moreover, synchronizing the mobile device with a second source is similar to the acts for synchronizing with the first source as described in detail above. Furthermore, for synchronizing with the second source, the first source can be ignored and a user can designate the group of files that require synchronization with such sources.

Files "a.doc", "b.doc", "c.doc" and "d.doc" are set up for an initial synchronization with the sources. For files "b.doc" and "c.doc" a value of "1" is assigned for the last change time, as no such modification has occurred. Moreover, a value of "0" has been assigned for a last synchronization time with source 1, as such files have not been synchronized therewith. When synchronization with source 2 is complete at 12:00 PM on April $23^{rd}$, then the file change tracking database table 710 is updated to reflect the last time synchronization occurred between the mobile device and source 2 is indicated at 708.

Figure 8:
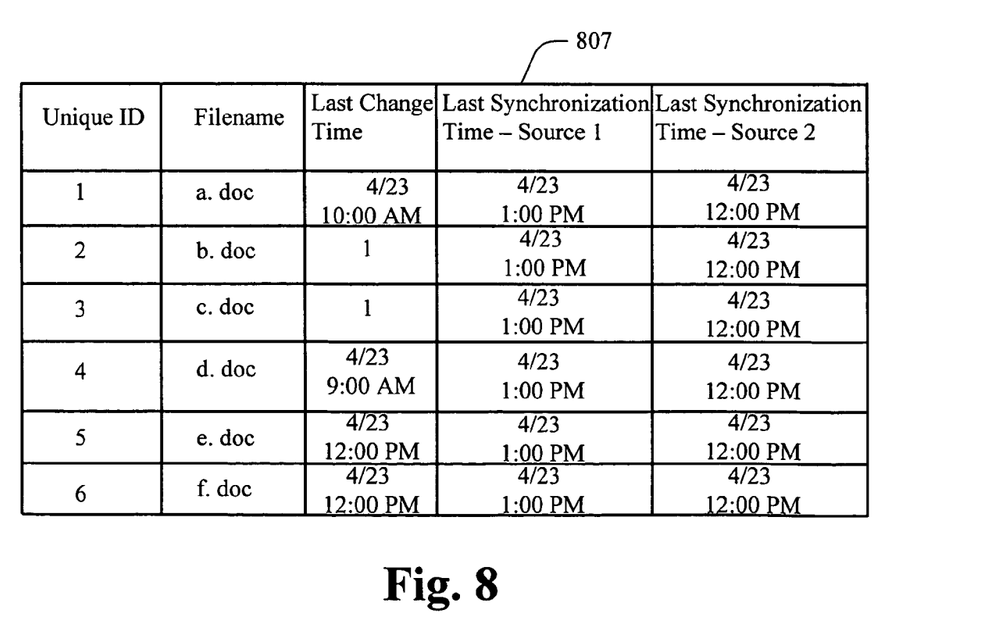
FIG. 8 illustrates changes occurring by synchronization with a second source that is propagated up to the first source, in accordance with an aspect of the subject invention.

In a related aspect, and after synchronization with the second source, synchronization back with the first source can occur. As illustrated in FIG. 8, changes occurring by synchronization with source 2 to the device can be propagated up to the first source, wherein files "e.doc" and "f.doc" are added as part of such changes. Assuming a synchronization at 1:00 PM on April $23^{rd}$, FIG. 8 illustrates the ensuing table. Accordingly, at this point both sources 1 and 2 have all the most recent versions of the files a.doc, b.doc, c.doc, d.doc, e.doc, and f.doc. It is to be appreciated that a continuous synchronization can also be provided for when the mobile device is cradled.

For example file notification can be employed in the flash ROM environment to indicate when files have changed so that device synchronization can push such changes up to the desk top. Also, in case of a conflict (e.g., when both the mobile device and the desktop report changes to the same unique file ID since the last synchronization, then such conflict is presented to the user and resolved per each item. Such conflict can also be resolved via employing various conflict resolution algorithms (e.g., setting priorities based on device type, time of creation for the file, author, and the like.)

Figure 9:
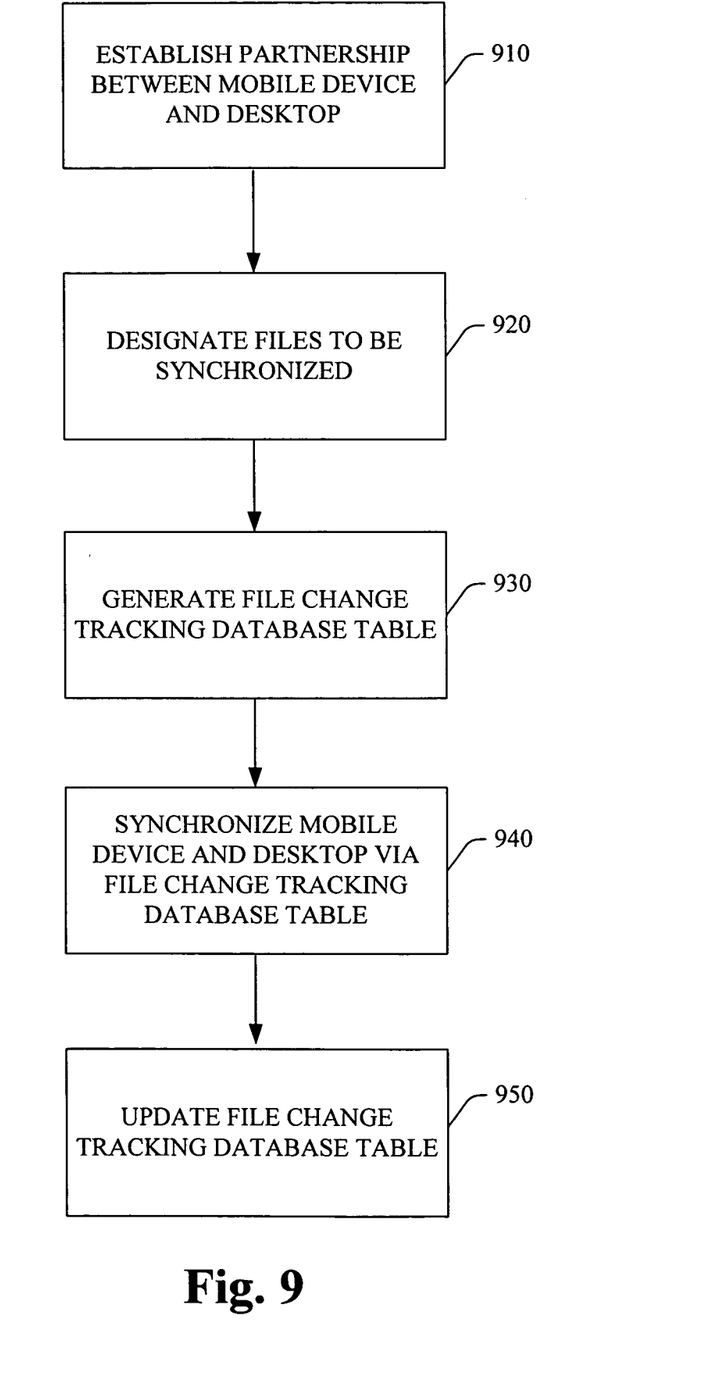
FIG. 9 illustrates a methodology of synchronization in accordance with an exemplary aspect of the subject invention.

FIG. 9 illustrates a methodology of synchronization in accordance with an aspect of the subject invention. While the exemplary method is illustrated and described herein as a series of blocks representative of various events and/or acts, the present invention is not limited by the illustrated ordering of such blocks. For instance, some acts or events may occur in different order and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Initially, and at 910 upon connection of a mobile device with a desktop, a partnership is created between the devices— e.g., via employing various Key Exchange subsystems for securing network traffic between the mobile device and the desktop. Such policy module(s) can also provide security configuration information via TCP/IP driver, thereby enabling secure network traffic between the desktop and the mobile device. Subsequently and at 920, a list of files to be synchronized can be identified. For such identification, it is to be appreciated a default setting can be established to synchronize files in a predetermined directory (e.g., my documents). Next, and at 930 a table is generated having unique file IDs associated with files to be synchronized. Such table can also include information obtained from the operating system (OS) regarding the last time the file was changed. The selected files can then be synchronized with the desktop at 940, via the file change tracking table, and such table updated to reflect the file synchronization, at 950.

Figure 10:
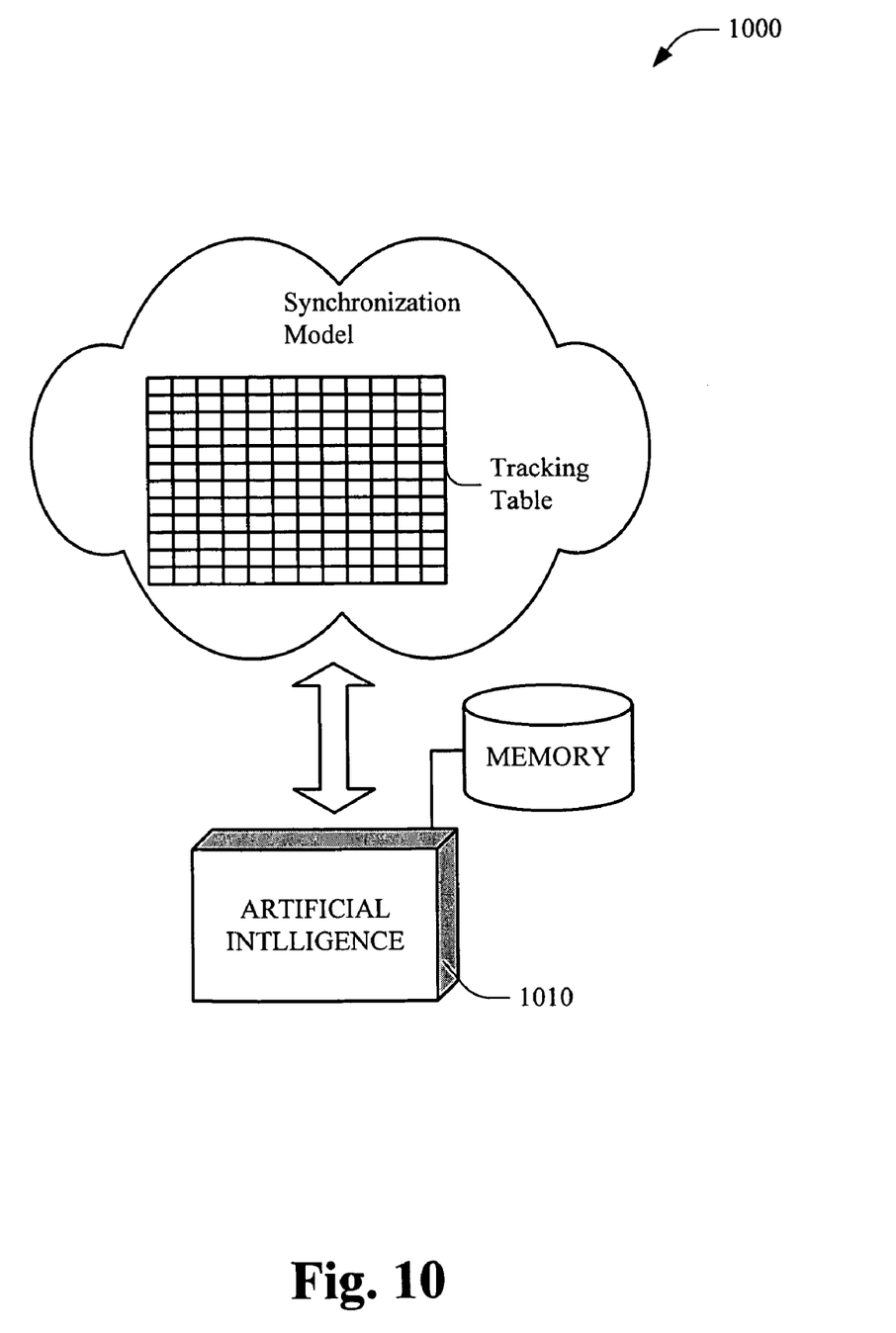
FIG. 10 illustrates various artificial intelligence based schemes that operate in conjunction with the file change tracking database table in accordance with an aspect of the subject invention.

As illustrated in the system 1000 of FIG. 10, the subject invention can employ various artificial intelligence based schemes (e.g., in connection with modeling a user behavior, roll back to earlier state of the files, and the like) for carrying out various aspects thereof. For example the artificial intelligence component, a process for learning explicitly or implicitly when a file change tracking database should be created/modified can be facilitated via an automatic classification system and process. Classification can employ a probabilistic and/or statistical-based analysis (e.g., factoring into the analysis utilities and costs) to prognose or infer an action that a user desires to be automatically performed. As used herein, the term "inference/infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

Figure 11:
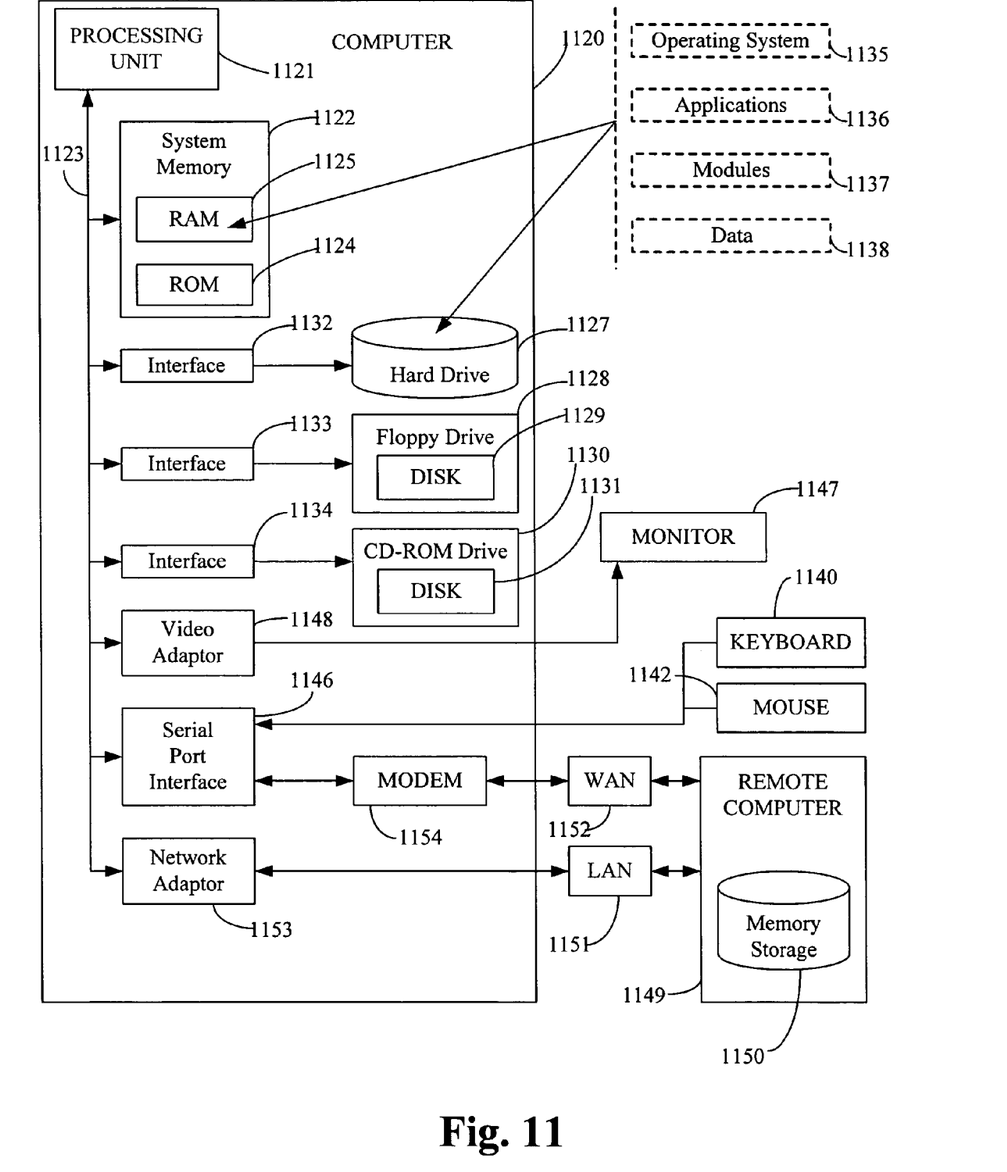
FIG. 11 illustrates a brief, general description of a suitable computing environment wherein the various aspects of the subject invention can be implemented

Referring now to FIG. 11, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 1120, including a processing unit 1121, a system memory 1122, and a system bus 1123 that couples various system components including the system memory to the processing unit 1121. The processing unit 1121 can be any of various commercially available processors. Dual microprocessors and other multi-processor architectures also can be used as the processing unit 1121.

The system bus can be any of several types of bus structure including a USB, 1394, a peripheral bus, and a local bus using any of a variety of commercially available bus architectures. The system memory may include read only memory (ROM) 1124 and random access memory (RAM) 1125. A basic input/output system (BIOS), containing the basic routines that help to transfer information between elements within the computer 1120, such as during start-up, is stored in ROM 1124. The computer 1120 further includes a hard disk drive 1127, a magnetic disk drive 1128, e.g., to read from or write to a removable disk 1129, and an optical disk drive 1130, e.g., for reading from or writing to a CD-ROM disk 1131 or to read from or write to other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of data, data structures, computer-executable instructions, etc. for the computer 1120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 1125, including an operating system 1135, one or more application programs 1136, other program modules 1137, and program data 1138. The operating system 1135 in the illustrated computer can be substantially any commercially available operating system.

A user can enter commands and information into the computer 1120 through a keyboard 1140 and a pointing device, such as a mouse 1142. Other input devices (not shown) can include a microphone, a joystick, a game pad, a satellite dish, a scanner, or the like. These and other input devices are often connected to the processing unit 1121 through a serial port interface 1146 that is coupled to the system bus, but may be connected by other interfaces, such as a parallel port, a game port or a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 can operate in a networked environment using logical connections to one or more remote computers, such as a remote computer 1149. The remote computer 1149 may be a workstation, a server computer, a router, a peer device or other common network node, and typically includes many or all of the elements described relative to the computer 1120, although only a memory storage device 1150 is illustrated in FIG. 11. The logical connections depicted in FIG. 11 may include a local area network (LAN) 1151 and a wide area network (WAN) 1152. Such networking environments are commonplace in offices, enterprise-wide computer networks, Intranets and the Internet.

When employed in a LAN networking environment, the computer 1120 can be connected to the local network 1151 through a network interface or adapter 1153. When utilized in a WAN networking environment, the computer 1120 generally can include a modem 1154, and/or is connected to a communications server on the LAN, and/or has other means for establishing communications over the wide area network 1152, such as the Internet. The modem 1154, which can be internal or external, can be connected to the system bus 1123 via the serial port interface 1146. In a networked environment, program modules depicted relative to the computer 1120, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 1120, unless otherwise indicated. Such acts and operations are sometimes referred to as being computer-executed. It will be appreciated that the acts and symbolically represented operations include the manipulation by the processing unit 1121 of electrical signals representing data bits which causes a resulting transformation or reduction of the electrical signal representation, and the maintenance of data bits at memory locations in the memory system (including the system memory 1122, hard drive 1127, floppy disks 1129, and CD-ROM 1131) to thereby reconfigure or otherwise alter the computer system's operation, as well as other processing of signals. The memory locations wherein such data bits are maintained are physical locations that have particular electrical, magnetic, or optical properties corresponding to the data bits.

Figure 12:
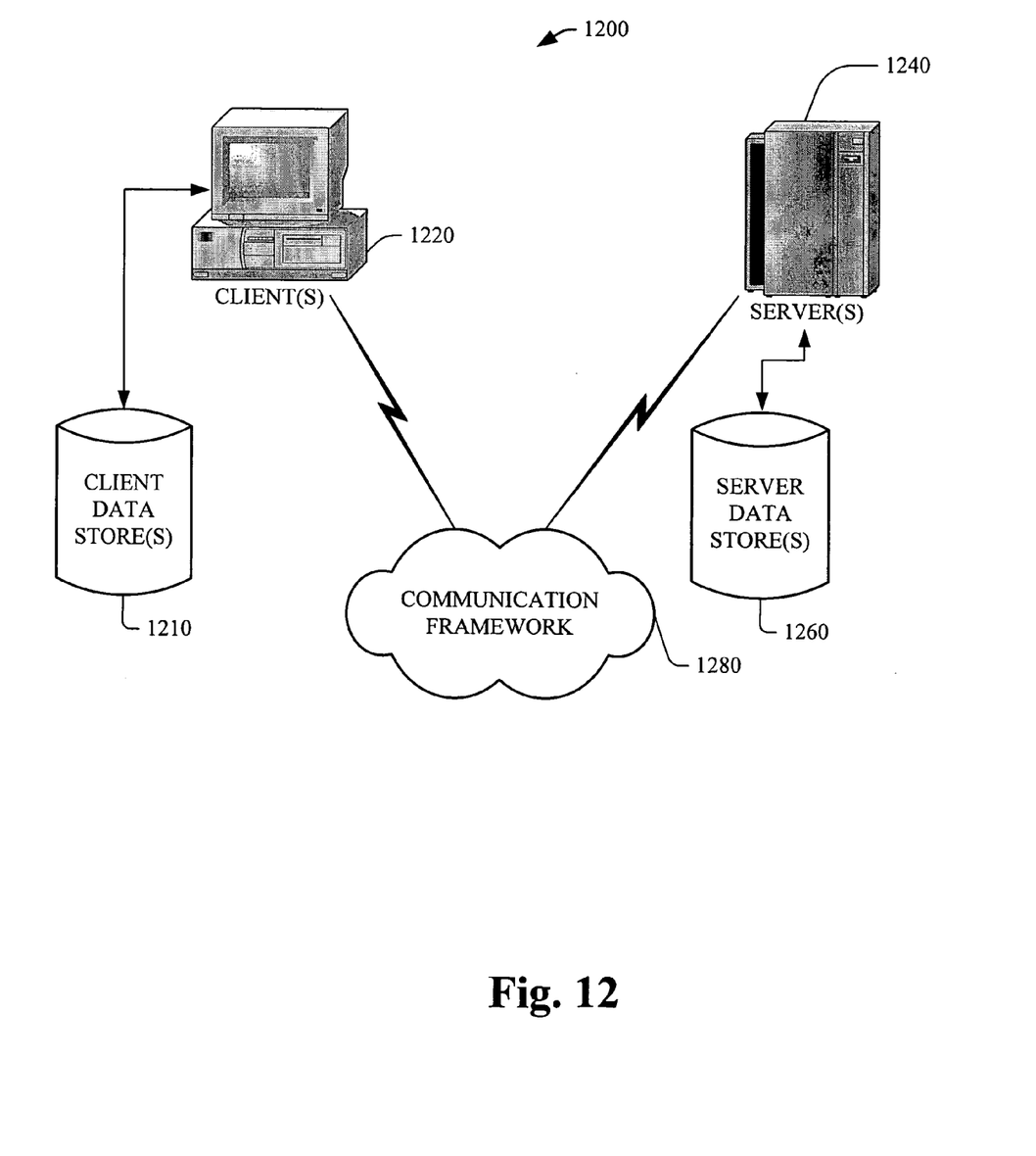
FIG. 12 illustrates a client-server system that can employ a file change tracking database table in accordance with an aspect of the subject invention.

Referring now to FIG. 12, a client-server system 1200 that can employ a file change tracking database table according to one aspect of the invention is illustrated. The client(s) 1220 can be hardware and/or software (e.g., threads, processes, computing devices). The system 1200 also includes one or more server(s) 1240. The server(s) 1240 can also be hardware and/or software (e.g., threads, processes, computing devices). For example, such servers 1240 can house threads to perform transformations by employing the invention. The client 1220 and the server 1240 can communicate, between two or more computer processes. As illustrated, the system 1200 includes a communication framework 1280 that can facilitate communications between the client(s) 1220 and the server(s) 1240. The client(s) 1220 is operationally connected to one or more client data store(s) 1210 that can store information local to the client(s) 1220. Moreover, client 1220 can access and update databases 1260 located on a server computer 1240 running a server process. In one aspect of the invention, the communication frame work 1280 can be the internet, with the client process being a Web browser and the server process being a Web server. As such, a typical client 1220 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1240 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates synchronization between a mobile device and a source, the system comprising:
   a file change tracking database table as part of a non-volatile storage medium, which select files for synchronization with a first source and provides for registration of an operating system (OS) of the device, such registration provides notification for when a file is changed;
   a file modification logger that interacts with the OS, to supply information about modified files to the file change tracking data base, the file modification logger comprises a memory that stores data related to event tracking for a file, and upon reaching a predetermined level, pointers associated with the memory are reset, data is overwritten on contents of the memory, and data is transported to other components; and
   a timer that selectively associates a time stamp with modification events of files as the files are modified, such a time stamp includes at least one of a bit count, a time of day indicator, a real time count, an absolute time count, or a relative time count, so that once information about the files has been modified, the information is gathered and reflected in an associated column in the file change tracking database table;
   wherein the file change tracking database table also synchronizes the mobile device with a second source, and wherein after synchronization with the second source, synchronization back with the first source occurs and changes occurring by synchronization with the second source are propagated up to the first source;
   wherein if a conflict occurs, such that both the first and second sources report changes to same file since last synchronization, the conflict is presented to the user and resolved via employing conflict resolution algorithms; and wherein artificial intelligence schemes are employed for learning when the file change tracking database table should be modified or a file rollback to an earlier state should be implemented.

2. The system of claim 1, the file change tracking data base table includes a column that contains unique identification for a file to be synchronized.

3. The system of claim 2, the file change tracking database table includes a column that contains a time the file was last modified.

4. The system of claim 3, the file change tracking database table includes a column that contains a previous time the file was synchronized with the first source.

5. The system of claim 4, the file change tracking database table includes a column that contains a previous time the file was synchronized with the second source.

6. The system of claim 4, the file change tracking database table indicates a value of "1" for a previous time the file was changed and a value of "0" for the previous time the file was synchronized with the first source.

7. A method of synchronizing a mobile device with a source, the method comprising:
creating a file change tracking database table as part of a non-volatile storage medium;
providing for registration of an operating system (OS) of the device, such registration provides notification for when a file is changed;
employing attributes of a filing system to select files from the file change tracking database table for synchronization;
selectively associating a time stamp with modification events of files as the files are modified, such a time stamp includes at least one of a bit count, a time of day indicator, a real time count, an absolute time count, or a relative time count;
gathering the modified information from the files and reflecting the modified information in an associated column in the file change tracking database table;
synchronizing the mobile device with a second source, such that a first source is ignored and a user designates a group of files that require synchronization with the second source;
synchronizing back with the first source, such that changes occurring by synchronization with the second source are propagated up to the first source;
presenting a conflict to the user and resolving the conflict via employing conflict resolution algorithms; and
synchronizing the mobile device with multiple sources to enable files to cross-pollinate between the sources via version tracking among the sources, wherein artificial schemes are employed for learning when the file change tracking database table should be modified or a file rollback to an earlier state should be implemented.

8. The method of claim 7 further comprising indicating a last time a file was modified in the file change tracking database table.

9. The method of claim 8 further comprising indicating a last time the file was synchronized with the first source.

10. The method of claim 9 further comprising comparing a last time the file was synchronized with the last time the file was modified.

11. The method of claim 10 further comprising synchronizing the file with the first source based on the comparing act.

12. The method of claim 11 further comprising updating the file change tracking database table upon completion of synchronization.

13. The method of claim 12 further comprising rolling back to an earlier state of the file.

14. The method of claim 12 further comprising identifying a file as a new file to the table, if an associated path does not appear in the file change tracking database table.

15. The method of claim 14 further comprising assigning a new ID to the new file for an addition to the file change tracking database table.

16. The method of claim 12 further comprising designating a file as deleted when a file system scan fails to show the file that appears in the file change tracking database table.

17. A system that facilitates synchronization between a mobile device and a source, the system comprising:
means for selecting files for synchronization and creating a file change tracking database table as part of a non-volatile storage medium;
means for supplying information about modified files to the means for selecting files;
means for selectively associating a time stamp with modification events of files as the files are modified, such a time stamp includes at least one of a bit count, a time of day indicator, a real time count, an absolute time count, or a relative time count;
means for gathering the modified information from the files and reflecting the modified information in an associated column in the file change tracking database table;
means for synchronizing the mobile device with a second source;
means for synchronizing back with the first source, such that changes occurring by synchronization with the second source are propagated up to the first source;
means for presenting a conflict to the user and resolving the conflict per each item via employing conflict resolution algorithms; and
means for modeling user behavior to determine when a roll back to an earlier state of the files can be implemented, or to obtain a state of the files at a particular synchronization stage, wherein artificial schemes are employed for learning when the file change tracking database table should be modified or a file rollback to an earlier state should be implemented.

18. The system of claim 1, wherein the file change tracking database table synchronizes the mobile device with multiple sources to enable files to cross-pollinate between the sources via version tracking among the sources.

19. The method of claim 7, further comprising modeling user behavior to determine when a roll back to an earlier state of the files can be implemented, or to obtain a state of the files at a particular synchronization stage.

20. The method of claim 7, further comprising employing artificial intelligence schemes for learning when the file change tracking database table should be modified.

* * * * *